United States Patent
Nguyen et al.

(10) Patent No.: US 7,231,493 B2
(45) Date of Patent: Jun. 12, 2007

(54) SYSTEM AND METHOD FOR UPDATING FIRMWARE OF A STORAGE DRIVE IN A STORAGE NETWORK

(75) Inventors: Nam V. Nguyen, Round Rock, TX (US); Bharath V. Vasudevan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 552 days.

(21) Appl. No.: 10/754,200

(22) Filed: Jan. 9, 2004

(65) Prior Publication Data
US 2005/0155029 A1  Jul. 14, 2005

(51) Int. Cl.
*G06F 12/00* (2006.01)
(52) U.S. Cl. .......................................... 711/114; 714/6
(58) Field of Classification Search ................ 711/114, 711/165; 714/6
See application file for complete search history.

(56) References Cited

U.S. PATENT DOCUMENTS

| | | | |
|---|---|---|---|
| 6,728,833 B2* | 4/2004 | Pruett et al. ................. | 711/114 |
| 6,907,504 B2* | 6/2005 | Burton et al. ................ | 711/162 |
| 7,032,218 B2* | 4/2006 | Shirasawa et al. ........... | 717/168 |
| 2005/0033933 A1* | 2/2005 | Hetrick et al. ............... | 711/165 |

\* cited by examiner

*Primary Examiner*—Hiep T. Nguyen
(74) *Attorney, Agent, or Firm*—Baker Botts L.L.P.

(57) ABSTRACT

A system and method for updating the firmware of storage drive in a drive array is disclosed. The method includes the steps of updating the firmware of a spare drive. The spare drive is swapped for a drive of the drive array having unupdated firmware. The content of the spare drive is built on the basis of the content of the other storage drives of the storage arrays and according to the data recovery scheme of the drive array. The firmware of the selected storage array is updated and the updated storage drive is swapped with the spare storage drive in the drive array. The content of the updated storage array is then rebuilt or restored.

20 Claims, 3 Drawing Sheets

SYSTEM AND METHOD FOR UPDATING FIRMWARE OF A STORAGE DRIVE IN A STORAGE NETWORK

TECHNICAL FIELD

The present disclosure relates generally to the field of computer networks, and, more particularly, to a system and method for updating the firmware of storage drives in a storage network.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computers, including servers and workstations, are often grouped in clusters to perform specific tasks. A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Server (MSCS), which is produced by the Microsoft Corporation of Redmond, Wash.

In some server cluster configurations, many components of the server cluster are redundant, allowing the component to be replaced or upgraded while the server cluster is online in the network and without affecting the operation of the network. Server clusters often include a shared storage element in which each drive of shared storage is accessible by each node, or server, of the server cluster. From time to time, the firmware associated with the storage drives comprising the shared storage must be updated. The process of updating the firmware of a storage drive involves taking the storage drive down or offline and updating the firmware. This step is followed by a reboot of the storage drive in which the storage drive is placed back in service in the shared storage of the server cluster.

The firmware update process often involves the necessity of taking offline the entire shared storage unit of the server cluster. The step of taking the shared storage of the server cluster offline for the purpose of updating the firmware of the storage drives of shared storage may occur on a scheduled basis or on an as-needed basis. Taking all of the shared storage of a server cluster offline is problematic in that server clusters often host critical applications that require high data availability. Taking the shared storage of server cluster offline increases the downtime for critical, hosted applications hosted that require uninterrupted operation and availability of shared storage. Because the shared storage of the cluster server is offline, the nodes of the server cluster will be unable to access the shared storage. Because of the difficulties involved in taking a critical application offline, many organizations choose not to update storage drive firmware, causing the storage drives of the shared storage to operate with firmware that is out of date or faulty, thereby degrading the operation of the entire server cluster.

The shared storage of the server cluster may include fault tolerant data storage. One example of fault tolerant data storage is a RAID (Redundant Array of Inexpensive Disks) storage system. RAID storage systems combine multiple disks into an array of disk drives to obtain performance, capacity, and reliability advantages. RAID Level 5 is an example of a fault tolerant data storage system. A RAID Level 5 storage system is characterized by the striping of data across the disks of the storage system. A set of parity bits generated by an exclusive-OR of the striped data bits is stored on a disk that is separate from the striped data. The parity bits for the respective stripes of data are distributed in the disks of the storage system so that each disk will likely contain both data bits for a stripe of data and parity bits related to some other stripe of data. In a Raid Level 5 storage system, it is typical that no single disk includes all of the parity bits. Raid Level 5 is often referred to as a rotating parity storage system. If a disk of a RAID Level 5 storage system fails, the data can be rebuilt by performing an exclusive-OR operation with the data of the other disks in the stripe, including the parity bits associated with the data stripe.

SUMMARY

In accordance with the present disclosure, a system and method for updating the firmware of storage drive in a drive array. The method includes the steps of updating the firmware of a spare drive. The spare drive is substituted for a drive of the drive array having unupdated firmware. The firmware of the selected drive in the storage array is updated and the updated storage drive is swapped back into the drive array. The content of the updated storage drive may be rebuilt on the basis of the content of the other storage drives of the drive array. Following the substitution of the updated storage drive for the spare storage drive of the drive array, the updated storage drive may be rebuilt by overwriting in the updated storage drive those lines of code that were modified in the spare storage drive during the period that the spare storage drive was included in the drive array.

The system and method disclosed herein is advantageous in that it allows for the updating of firmware of the storage drives of a shared storage system without the necessity of taking the shared storage system offline during the firmware update process. Because the firmware update process occurs while the shared storage system is online, critical applications may continue to run in the clustered servers while the firmware update process is occurring in the shared storage system. The system and method disclosed herein is also advantageous because the system and method accommodates modifications to the shared storage during the firmware update process. If a substituted storage drive is modified, the changes to the substituted storage drive can be reflected in the updated storage drive when the updated storage drive is returned to the drive array in the storage system. In this manner, the data of the substituted storage drive can be rebuilt quickly. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
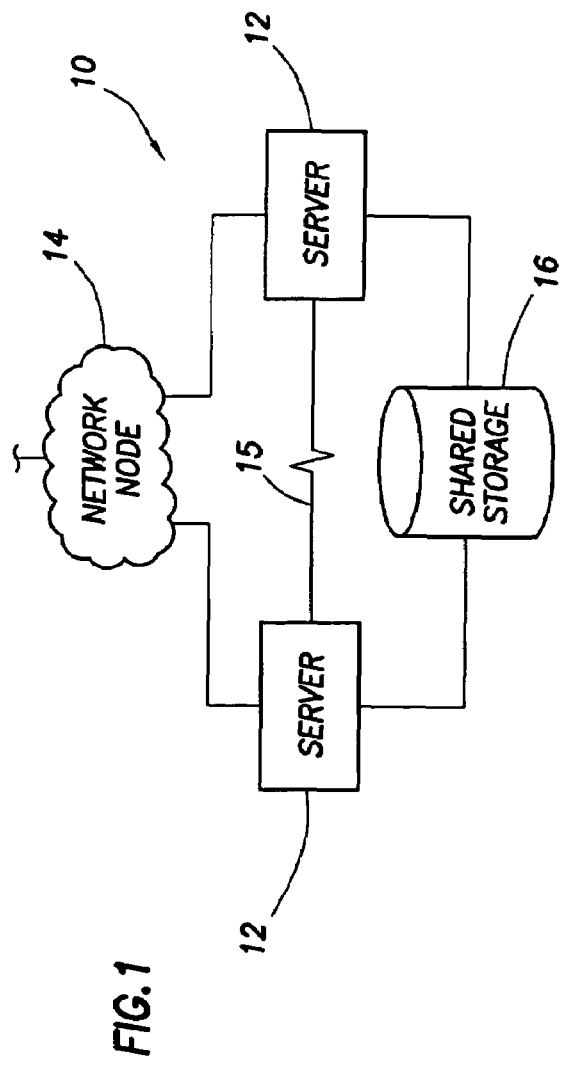
FIG. 1 is a block diagram of a server cluster network.
Figure 2:
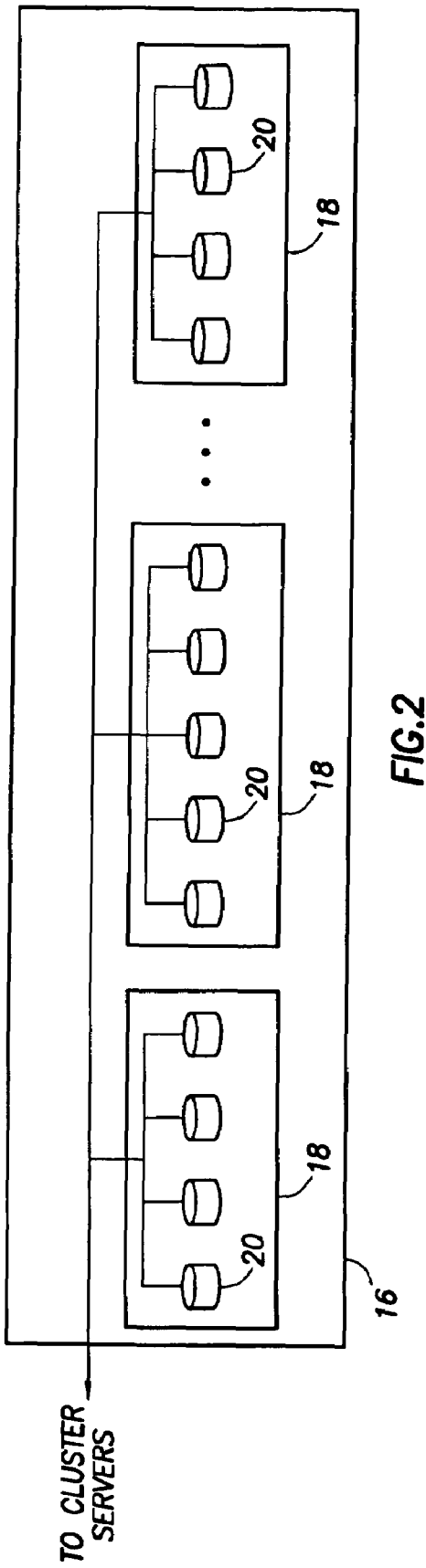
FIG. 2 is a block diagram of a shared storage unit.

Shown in FIG. 1 is a two-node server cluster network, which is indicated generally at 10. Server cluster network 10 includes server nodes 12 that are interconnected to one another by a heartbeat or communications link 15. Each of the server nodes 12 is coupled to a network node 14, which represents a connection to a communications network served by the server nodes 12. Each of the server nodes 12 is coupled to a shared storage unit 16. Shown in FIG. 2 is a diagram of shared storage unit 16, which includes a number of drive arrays 18. Each drive array 18 includes a number of interconnected storage disks or drives 20 that are managed according to a fault tolerant data storage methodology, such as a RAID methodology. The shared storage unit 16 of FIG. 2 is shown as having three drive arrays 18, although other configurations of shared storage unit 16 may have more of fewer drive arrays.

Figure 3:
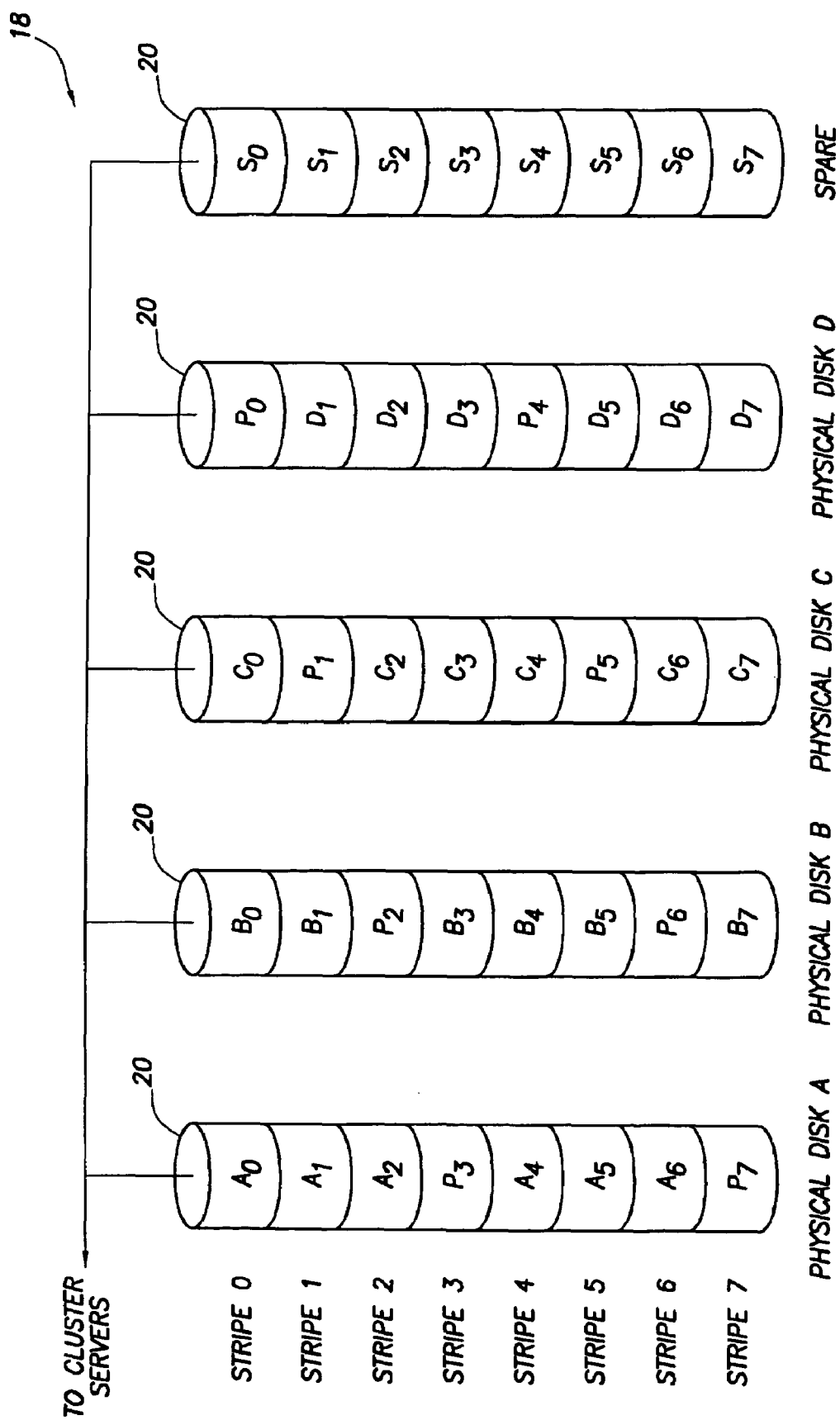
FIG. 3 is a diagram of a drive array.

The storage drives of a drive array may operate according to a RAID Level 5 data storage scheme. RAID Level 5 is characterized by the inclusion of a parity strip in each stripe of data as a method of protecting and providing for the ability to rebuild or restore the data of the strip on the basis of the data stored on the remaining strips of data in the data stripe. Shown generally at 18 in FIG. 3 is a diagram of a drive array that includes five data drives, labeled Physical Disk A through Physical Disk D, and a spare disk. Each of the four data disk in the example of FIG. 3 includes eight stripes or rows of data, labeled Stripe 0 through Stripe 7. It should be recognized that the configuration of the RAID array of FIG. 3 is an illustration and that an implementation of a RAID array may have more or few disks with more or fewer stripes or rows. The size or width of each stripe of data may be, for example, 64 KB per disk.

With reference to Stripe 0, data is stored Disk A, Disk B, and Disk C. The parity bits for Stripe 0, which are the result of an exclusive-OR operation performed on the content of Stripe 0 in Disk A, Disk B, and Disk C, are stored in Disk D and labeled $P_0$. As a second example of the data structure of the RAID Array 18, with reference to Stripe 7, data is stored Disk B, Disk C, and Disk D. The parity bits for Stripe 7, which are the result of an exclusive-OR operation performed on the content of Stripe 7 in Disk B, Disk C, and Disk D, are stored in Disk A and labeled $P_7$. If, for example, Disk C were to fail or be replaced, the data in each stripe of Disk C would be rebuilt with the data in the other three disks of RAID array 18.

The spare storage drive of drive array 18 is likewise arranged into a number of logical stripes that mirror the scheme used for the data or active storage drives. In this example, the spare storage drive includes seven stripes, labeled $S_0$–$S_7$. In normal operation, the spare storage drive is not used as part of the RAID Level 5 data storage scheme. Instead, the spare storage drive exists in the shared storage unit 16 (FIGS. 1 and 2) and can be associated with any one or more of the drive arrays 18 for the sake of the firmware update process disclosed herein.

Figure 4:
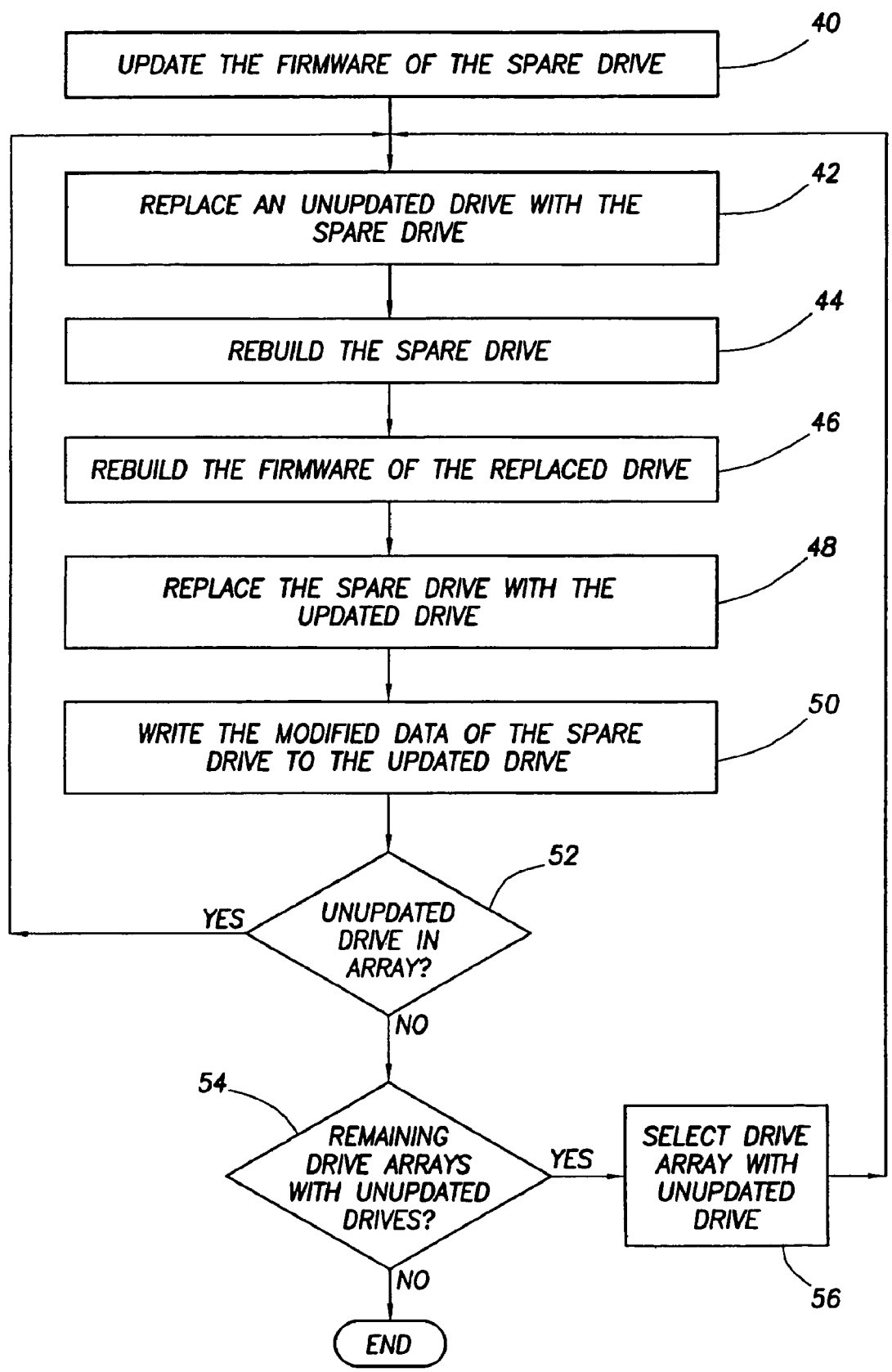
FIG. 4 is a flow diagram of a method for updating the firmware of the shared storage drives in a storage network.

Shown in FIG. 4 is a series of method steps for updating the firmware of the shared storage drives in a storage network. The steps of FIG. 4 are initiated after it has been determined that the firmware of the storage drives of a drive array will be updated. Before the initiation of the firmware update process, the spare storage drive of the drive array is functioning as a spare storage drive and does not contain data that is being stored and managed as part of the fault tolerant shared storage unit. At step 40, the firmware of the spare storage drive of the drive array is updated. Updating the firmware of a storage drive, such as a spare storage drive, typically involves saving the firmware update to a designated memory location associated with the firmware of the storage drive, and rebooting the storage drive. Because the spare storage drive exists as a standalone drive and is not involved in the storage of active data, the update of the firmware of the spare storage drive does not implicate the function or the data integrity of the drive array.

At step 42, an unupdated storage drive is replaced with the spare storage drive. At this point, the firmware of the spare storage drive has been updated. The firmware of the replaced drive has not been updated. With referenced to FIG. 3, the spare storage drive of FIG. 3 could replace, as part of step 42 of FIG. 4, Disk A. Following step 42, step 44 and step 46 can occur concurrently. At step 44, the contents of the spare storage drive are rebuilt such that the spare storage drive functions as a volume of the fault tolerant drive array. With reference to a RAID Level 5 data storage scheme, the contents of the spare storage drive are rebuilt according to a reverse calculation exclusive-OR scheme with the contents of Disk B, Disk C, and Disk D. It should also be recognized that the entire contents of the spare storage drive need not be rebuilt. Instead, only those portions of the spare storage drive that are subject to a read command could be rebuilt. In this manner, once a user seeks data that is stored on swapped-out Disk A, the data will be rebuilt on the substituted spare storage drive, using the contents of Disk B, Disk C, and Disk D, and then read out of the substituted spare storage drive.

At step 46, the firmware of replaced Disk A is updated. The update of the firmware of Disk A does not affect the function of the drive array, as Disk A is not included during this time as a volume in the drive array. At step 48, the updated storage drive, which in this instance is Disk A, replaces the spare storage drive in the drive array. At step 60, when the updated storage drive is returned to the drive array to swap with the spare storage drive, data in the updated storage drive is overwritten with the data that has been modified in the spare storage drive during the period that the spare storage drive was substituted for the updated storage drive of the drive array. In this manner, rather than rebuilding the entire contents of the updated storage drive using a reverse calculation exclusive-OR scheme, only those lines that have been modified are written to the updated storage drive. During the period that the updated storage drive is not in the drive array, a table may be kept of the addresses of the modified lines of data. Upon replacing the spare storage drive with the updated storage drive in the drive array, the data residing in the modified lines of the spare storage drive is written to the corresponding lines in the updated storage drive. At step 52 of FIG. 4, it is determined whether unupdated storage drives remain in the drive array. If unupdated storage drives remain in the drive array, the flow diagram continues at step 42, which involves the selection of an unupdated storage drive for the swapping out process of step 42 through step 50. In these steps, the unupdated storage drive is swapped with the spare storage drive, which is rebuilt as a member of the drive array. The unupdated storage drive is updated with new firmware and swapped back into the drive array, where its content is rebuilt. If it is determined at step 52 that there are no other unupdated storage drives in the storage array, processing continues with step 54.

At step 54, it is determined if there are remaining drive arrays in the shared storage unit that include unupdated storage drives. If such drive arrays and unupdated storage drives do exist in the shared storage unit, a drive array is selected and the flow continues at step 42 with the selection of an unupdated storage drive and the swapping out of unupdated storage drives with the spare storage drive. This cycle of FIG. 4 continues until all storage drives of all drive arrays in the shared storage unit have been updated. When it is determined at step 54 that no drive arrays exist with unupdated storage drives, the method described in FIG. 4 ends.

If a drive of the drive array fails during the period that an updated spare drive is present in the drive array, the failure of the drive array is assessed following the firmware update of the replaced drive, and the replacement and rebuild of the replaced drive in the drive array. If the storage array has failed because of the failure of one of the disks of the disk arrays, the rebuild process can proceed once the replaced drive is returned to the drive array in a rebuilt condition.

The techniques disclosed herein are not limited to the updating of drive firmware. Instead, the technique disclosed herein can be used in any environment in which it is necessary to take a drive out of service for a short period. Each drive array of a shared storage unit need not include a dedicated spare storage drive. Instead, a single spare storage drive or multiple spare storage drives may be shared among the drive arrays of a single shared storage unit. The system and method disclosed herein is not limited in its use to RAID storage methodologies. Rather, the technique disclosed herein may be employed with any data storage configurations in which a storage drive may be swapped in and out of a storage array for a firmware update step without compromising the function or data integrity of the remainder of the storage drives of the shared storage unit. Although the present disclosure has been described in detail, it should be understood that various changes, substitutions, and alterations can be made hereto without departing from the spirit and the scope of the invention as defined by the appended claims.

What is claimed is:

1. A method for updating the firmware of a storage drive of a fault tolerant drive array, comprising the steps of:
updating the firmware of a spare storage drive;
substituting the spare storage drive for a first storage drive in the drive array having unupdated firmware, wherein the spare storage drive functions as a drive of the fault tolerant drive array, and wherein, upon a write to the spare storage drive during the period that the spare storage drive is present in the drive array, modifying data in the spare storage drive;
updating the firmware in the first storage drive; and
substituting the first storage drive for the spare storage drive.

2. The method for updating the firmware of a storage drive of a fault tolerant drive array of claim 1, wherein the drive array operates according to a RAID Level 5 storage methodology.

3. The method for updating the firmware of a storage drive of a fault tolerant drive array of claim 2, further comprising the step of, upon a read to the spare storage drive during the period that the spare storage drive is present in the drive array, building the content of the spare storage drive with reference to the content of the remainder of the storage drives of the drive array.

4. The method for updating the firmware of a storage drive of a fault tolerant drive array of claim 1, further comprising the step of building the content of the first storage drive with reference to the content of the remainder of the storage drives of the drive array.

5. The method for updating the firmware of a storage drive of a fault tolerant drive array of claim 4, wherein the step of building the content of the first storage drive with reference to the content of the remainder of the storage drives of the drive array comprises the step of building the content of the spare storage drive by performing for each strip of data in the spare storage drive an exclusive-OR calculation on the remainder of the strips of each stripe in the storage drive.

6. The method for updating the firmware of a storage drive of a fault tolerant drive array of claim 4, further comprising the steps of:
providing a list of those addresses in the spare storage drive that include data that was modified during the period that the spare storage drive was substituted for the first storage drive; and writing the contents of those addresses in the spare storage drive to the corresponding addresses in the first storage drive.

7. A method for updating the firmware of one or more storage drives in a fault tolerant drive array, comprising the steps of:

updating the firmware of a spare storage drive;

substituting the spare storage drive for a first storage drive of the drive array, wherein the spare storage drive functions as a drive of the fault tolerant drive array, and wherein, upon a write to the spare storage drive during the period that the spare storage drive is present in the drive array, modifying data in the spare storage drive;

updating the firmware of the first storage drive; and substituting the first storage drive for the spare storage drive of the drive array.

8. The method for updating the firmware of one or more storage drives in a fault tolerant drive array of claim 7, further comprising the step of building the content of the first storage drive on the basis of the content of the other storage drives of the drive array.

9. The method for updating the firmware of one or more storage drives in a fault tolerant drive array of claim 8, further comprising the steps of:

providing a list of those addresses in the spare storage drive that include data that was modified during the period that the spare storage drive was substituted for the first storage drive; and writing the contents of those addresses in the spare storage drive to the corresponding addresses in the first storage drive in conjunction with the step of substituting the first storage drive for the spare storage drive of the drive array.

10. The method for updating the firmware of one or more storage drives of a fault tolerant drive array of claim 9, further comprising the steps of:

substituting the spare storage drive in the drive array for a storage drive having unupdated firmware;

building the content of the spare storage drive on the basis of the content of the remainder of the storage drives of the drive array; and updating the firmware of the storage drive having unupdated firmware;

substituting the newly updated storage drive for the spare storage drive; and providing a list of those addresses in the spare storage drive that include data that was modified during the period that the spare storage drive was substituted for the first storage drive; and writing the contents of those addresses in the spare storage drive to the corresponding addresses in the first storage drive in conjunction with the step of substituting the first storage drive for the spare storage drive of the drive array.

11. The method for updating the firmware of one or more storage drives of a fault tolerant drive array of claim 10, wherein the steps set out in claim 10 are repeated until each storage drive of the drive array includes updated firmware.

12. The method of updating the firmware of one or more storage drives in a fault tolerant drive array of claim 10, wherein the step of building the content of a storage drive in the drive array is accomplished by performing, for each strip of data in the effected storage drive, an exclusive OR calculation on the remainder of the strips of each stripe in the storage drives of the drive array.

13. A method for updating the firmware of one or more storage drives in a fault tolerant drive array, comprising the steps of:

updating the firmware of a spare storage drive;

substituting the spare storage drive in the drive array for a storage drive having unupdated firmware, wherein the spare storage drive functions as a drive of the fault tolerant drive array, and wherein, upon a write to the spare storage drive during the period that the spare storage drive is present in the drive array, modifying data in the spare storage drive;

updating the firmware of the storage drive having unupdated firmware;

substituting the newly updated storage drive for the spare storage drive; and building the content of the newly updated storage drive on the basis of the content of the remainder of the storage drives of the storage array.

14. The method for updating the firmware of one or more storage drives in a fault tolerant drive array of claim 13, wherein the steps set out in claim 13 are repeated until each storage drive of the drive array includes updated firmware.

15. The method of updating the firmware of one or more storage drives in a fault tolerant drive array of claim 13, further comprising the step of, upon a read to the spare storage drive, building the content of the accessed portion of the spare storage drive.

16. The method for updating the firmware of one or more storage drives in a fault tolerant drive array of claim 13, wherein the drive array operates according to a RAID Level 5 storage methodology.

17. A method for updating the firmware of the storage drives of each fault tolerant drive array of a shared storage unit, comprising the steps of:

updating the firmware of a spare storage drive;

identifying a drive array having at least one storage drive with unupdated firmware;

substituting the spare storage drive for a storage drive having unupdated firmware, wherein the spare storage drive functions as a drive of the fault tolerant drive array and wherein, upon a write to the spare storage drive during the period that the spare storage drive is present in the drive array, modifying data in the spare storage drive;

updating the firmware of the selected storage drive;

replacing the spare storage drive with the selected storage drive;

building the content of the selected storage drive;

repeating the steps of substituting the spare storage drive for a storage drive having unupdated firmware; updating the firmware of the selected storage drive; and building the content of the selected storage drive until each drive of the identified storage array has updated firmware; and repeating the steps of identifying a drive array having at least one storage drive with unupdated firmware, substituting the spare storage drive for a storage drive having unupdated firmware; updating the firmware of the selected storage drive; and building the content of the selected storage drive until all storage drives of all drive arrays in the shared storage unit include updated firmware.

18. The method for updating the firmware of the storage drives of each fault tolerant drive array of a shared storage unit of claim 17, wherein the step of building the content of the selected storage drive occurs on the basis of the content of the other storage drives of the drive array.

19. The method for updating the firmware of the storage drives of each fault tolerant drive array of a shared storage unit of claim 17, further comprising the steps of:
providing a list of addresses modified in the spare storage drive during the period that the spare storage drive is included in the drive array; and
writing the content of the modified addresses of the spare storage drive to the corresponding addresses in the selected storage drive in conjunction with the step of replacing the spare storage drive with the selected storage drive.

20. The method for updating the firmware of the storage drives of each fault tolerant drive array of a shared storage unit of claim 17, wherein each drive array operates according to a RAID Level 5 storage methodology.

* * * * *